United States Patent
Kim

(10) Patent No.: US 9,484,798 B2
(45) Date of Patent: Nov. 1, 2016

(54) POWER CONTROL DEVICE AND IMAGE FORMING APPARATUS INCLUDING THE SAME

(71) Applicant: Samsung Electronics Co., Ltd., Suwon-si (KR)

(72) Inventor: Jin Ha Kim, Ochang-myeon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 166 days.

(21) Appl. No.: 14/314,213

(22) Filed: Jun. 25, 2014

(65) Prior Publication Data

US 2015/0023073 A1   Jan. 22, 2015

(30) Foreign Application Priority Data

Jul. 17, 2013 (KR) .................. 10-2013-0084343

(51) Int. Cl.
| | | |
|---|---|---|
| *H02H 7/127* | (2006.01) | |
| *H02M 1/32* | (2007.01) | |
| *H02M 1/36* | (2007.01) | |
| *H02M 1/12* | (2006.01) | |
| *H02M 7/12* | (2006.01) | |

(52) U.S. Cl.
CPC .................. *H02M 1/32* (2013.01); *H02M 1/12* (2013.01); *H02M 1/36* (2013.01); *H02M 7/12* (2013.01); *H02H 7/127* (2013.01); *H02M 2001/322* (2013.01)

(58) Field of Classification Search
CPC .... H02H 7/106; H02H 7/127; H02H 7/1209; H02M 1/32; H02M 1/36; H02M 3/33507; H02M 3/33523; H02M 2001/0032; H02M 7/5387; H02M 7/53871; H02M 7/53875
USPC .................. 363/21.12–21.18, 49–52, 95–98
See application file for complete search history.

(56) References Cited

U.S. PATENT DOCUMENTS 7,002,814 B2 * 2/2006 Kim .................. G06F 1/26
  363/21.15
2011/0122668 A1   5/2011 Lo et al.
(Continued)

FOREIGN PATENT DOCUMENTS

EP   2003769   12/2008

OTHER PUBLICATIONS

Extended European Search Report dated Jul. 2, 2015 in European Patent Application No. 14168711.1.
(Continued)

*Primary Examiner* — Yemane Mehari
(74) *Attorney, Agent, or Firm* — Staas & Halsey LLP

(57) ABSTRACT

A power control device and an image forming apparatus including the same are disclosed. A power control device meets the need for low power consumption by minimizing standby power consumption in a plug-on state of an electronic apparatus, and meets the safety requirements by increasing a discharging rate of an X-cap or an E-cap in a plug-off state. The power control device includes a first capacitor charged by AC power during input of the AC power, a rectifier converting the AC power to DC power, a second capacitor disposed at an output of the rectifier, and a discharge circuit including at least one discharge resistor, and a first switch and a second switch configured to be alternately turned on/off in response to supply and interruption of the AC power, and discharging at least one of the first and second capacitors via the at least one discharge resistor, in response to turn-off of the first switch and turn-on of the second switch.

21 Claims, 7 Drawing Sheets

(56) References Cited

U.S. PATENT DOCUMENTS

2012/0134185 A1   5/2012   Shin et al.
2012/0161522 A1*  6/2012   Nam ................. H02J 9/005
                                                307/64

OTHER PUBLICATIONS

European Office Action dated Jun. 28, 2016 in European Patent Application No. 14168711.1.

* cited by examiner

POWER CONTROL DEVICE AND IMAGE FORMING APPARATUS INCLUDING THE SAME

CROSS-REFERENCE TO RELATED APPLICATIONS

This application claims the priority benefit of Korean Patent Application No. 10-2013-0084343, filed on Jul. 17, 2013 in the Korean Intellectual Property Office, the disclosure of which is incorporated herein by reference.

BACKGROUND

1. Field

Embodiments relate to a power control device and an image forming apparatus including the same. More specifically, embodiments relate to a power control device configured to reduce standby power consumption, and an image forming apparatus including the same.

2. Description of the Related Art

From the point of view of environmental protection, restriction on standby power consumption of electrical appliances for energy-saving is being strongly imposed in Americas (EPA1.2) and Europe (ErP step 2) as well as in Korea. In order to cope with the restriction, various efforts are under way to reduce the standby power consumption of electrical appliances.

For example, an electromagnetic interference (EMI) filter for removing noise is included in an input of a power supply (e.g. a switch-mode power supply), and if electrical charges of an X-capacitor included in the EMI filter flow to a metal terminal of a plug during a plug-off state, a safety problem may occur. Accordingly, in order to solve the problem, a discharge resistor configured to discharge charges filled in the X-capacitor may be used. However, there is power consumption in a plug-on state due to the discharge resistor, which is against the effort for reducing the standby power consumption of electrical appliances. Therefore, measures to solve the problem are needed.

SUMMARY

In an aspect of one or more embodiments, there is provided a power control device which meets the need for low power consumption by minimizing standby power consumption in a plug-on state of an electronic apparatus, and meets the safety requirements by increasing a discharging rate of an X-cap or an E-cap in a plug-off state.

In an aspect of one or more embodiments, there is provided a power control device which includes a first capacitor charged by AC power during input of the AC power, a rectifier converting the AC power to DC power, a second capacitor formed at an output of the rectifier, and a discharge circuit including at least one discharge resistor, and a first switch and a second switch configured to be alternately turned on/off in response to supply and interruption of the AC power. The discharge circuit discharges at least one of the first and second capacitors via the at least one discharge resistor, in response to turn-off of the first switch and turn-on of the second switch.

The first capacitor may be electrically connected between input lines through which the AC power is input.

The rectifier may be connected to the input line of the AC power.

The first switch may be a detection circuit including a photo-coupler configured to be electrically connected between the input lines of the AC power, and turned on in response to input of the AC power and turned off in response to interruption of the AC power.

The second capacitor may be disposed at an output of the rectifier.

The second switch may be a discharge circuit including at least one discharge resistor and at least one first transistor which are connected in series to the output of the rectifier.

The first switch may further include an RC series circuit electrically connected in series to the photo-coupler between the input lines of the AC power.

The RC series circuit may include a resistor and a capacitor which are connected in series to an end of the photo-coupler, and another resistor and another capacitor which are connected in series to the other end of the photo-coupler.

The RC series circuit may include a resistor and a capacitor which are connected in series to an end of the photo-coupler.

The RC series circuit may include a resistor connected in series to an end of the photo-coupler, and a capacitor connected in series to the other end of the photo-coupler.

The photo-coupler may include a light emitting device connected to the RC series circuit, and a light receiving device configured to be turned on in response to emission of the light emitting device.

The light emitting device of the first switch may be a bidirectional light emitting diode.

The light receiving device of the first switch may be an NPN-type photo transistor, and an emitter and a collector of the photo transistor may be electrically connected to the second switch.

The at least one first transistor of the second switch may be a PNP-type bipolar transistor. An emitter of the first transistor may be connected to the discharge resistor, and a collector of the first transistor may be connected to a ground.

The second switch may further include a detection resistor connected between a collector of the photo-transistor and the output of the rectifier.

The second switch may have a resistivity of the detection resistor relatively greater than a resistivity of the discharge resistor.

The second switch may include an RC parallel circuit connected between a base and a collector of the at least one first transistor.

The second switch may further include a second transistor configured to turn on the first transistor by being turned on in response to turn-off of the photo-coupler.

The second transistor of the second switch may be an NPN-type bipolar transistor. A collector of the second transistor may be connected to a base of the first transistor, and an emitter of the second transistor may be grounded.

In an aspect of one or more embodiments, there is provided an image forming apparatus which includes a power control device includes a first capacitor charged by AC power during input of the AC power, a rectifier transforming the AC power to DC power, a second capacitor disposed at an output of the rectifier, and a discharge circuit including at least one discharge resistor, and a first switch and a second switch configured to be alternately turned on/off in response to supply and interruption of the AC power. The discharge circuit discharges at least one of the first and second capacitors via the at least one discharge resistor, in response to turn-off of the first switch and turn-on of the second switch.

The first capacitor may be electrically connected between input lines through which the AC power is input.

The rectifier may be connected to the input line of the AC power.

The first switch may be a detection circuit including a photo-coupler configured to be electrically connected between the input lines of the AC power, and turned on in response to input of the AC power and turned off in response to interruption of the AC power.

The second capacitor may be disposed at an output of the rectifier.

The second switch may be a discharge circuit including at least one discharge resistor and at least one first transistor which are connected in series to the output of the rectifier.

In an aspect of one or more embodiments, there is provided a power control device including an electromagnetic interference (EMI) filter including a first capacitor, which is charged by AC power and which removes noise; a rectifier which converts the AC power to DC power; a second capacitor which is formed between an output of the rectifier and a transformer in order to smooth DC power during interruption of AC power; and a discharge circuit includes at least one discharge resistor, and a first switch and a second switch configured to be alternately turned on/off in response to supply and interruption of the AC power, and which discharges at least one of the first and second capacitors via the at least one discharge resistor, in response to turn-off of the first switch and turn-on of the second switch.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
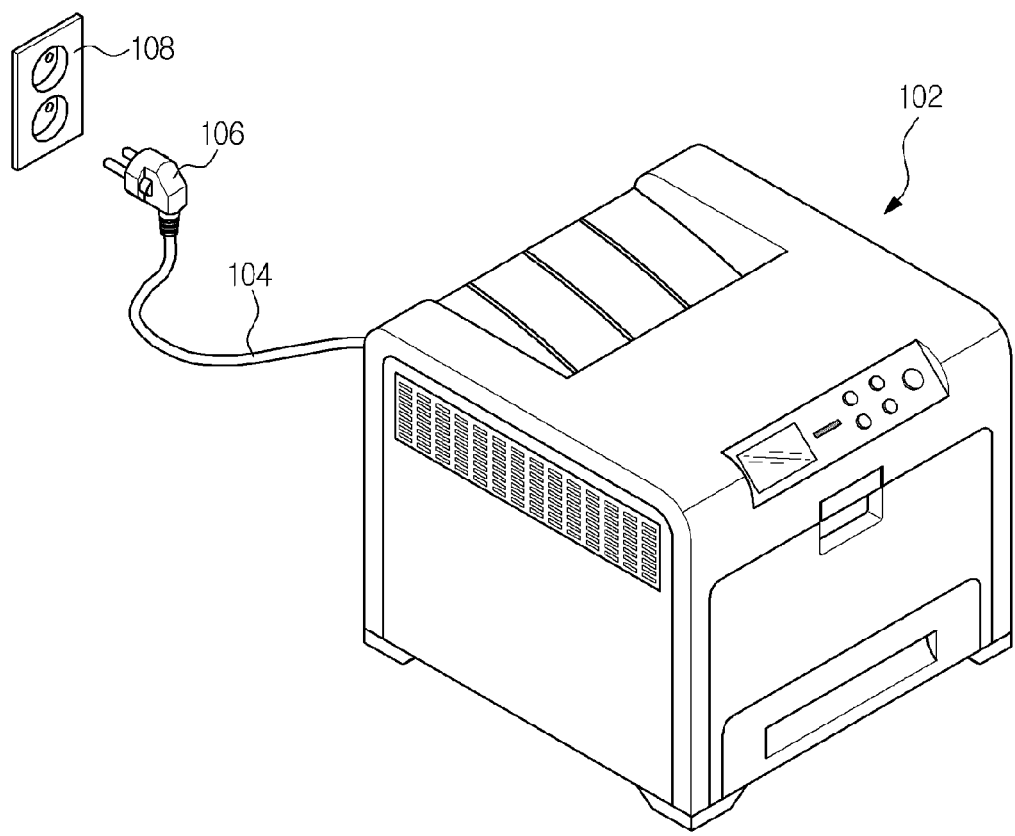
FIG. 1 is a diagram showing a laser printer as an image forming apparatus in accordance with an embodiment.

Reference will now be made in detail to embodiments, examples of which are illustrated in the accompanying drawings, wherein like reference numerals refer to like elements throughout.

FIG. 1 is a diagram showing a laser printer as an image forming apparatus in accordance with an embodiment. The image forming apparatus 102 includes a power cable 104 configured to receive power, and a plug 106 disposed at an end of the power cable 104. By inserting the plug 106 into a socket 108 of an outlet or multi-tab, normal AC power supplied from an external power source may be supplied to the image forming apparatus 102. The image forming apparatus 102 may perform a work related to image processing by receiving power through the plug 106 inserted into the socket 108, and the power cable 104. Hereinafter, plug-on represents that the plug 106 is inserted into the socket 108, and plug-off represents that the plug 106 inserted in the socket 108 is separated from the socket 108.

Figure 2:
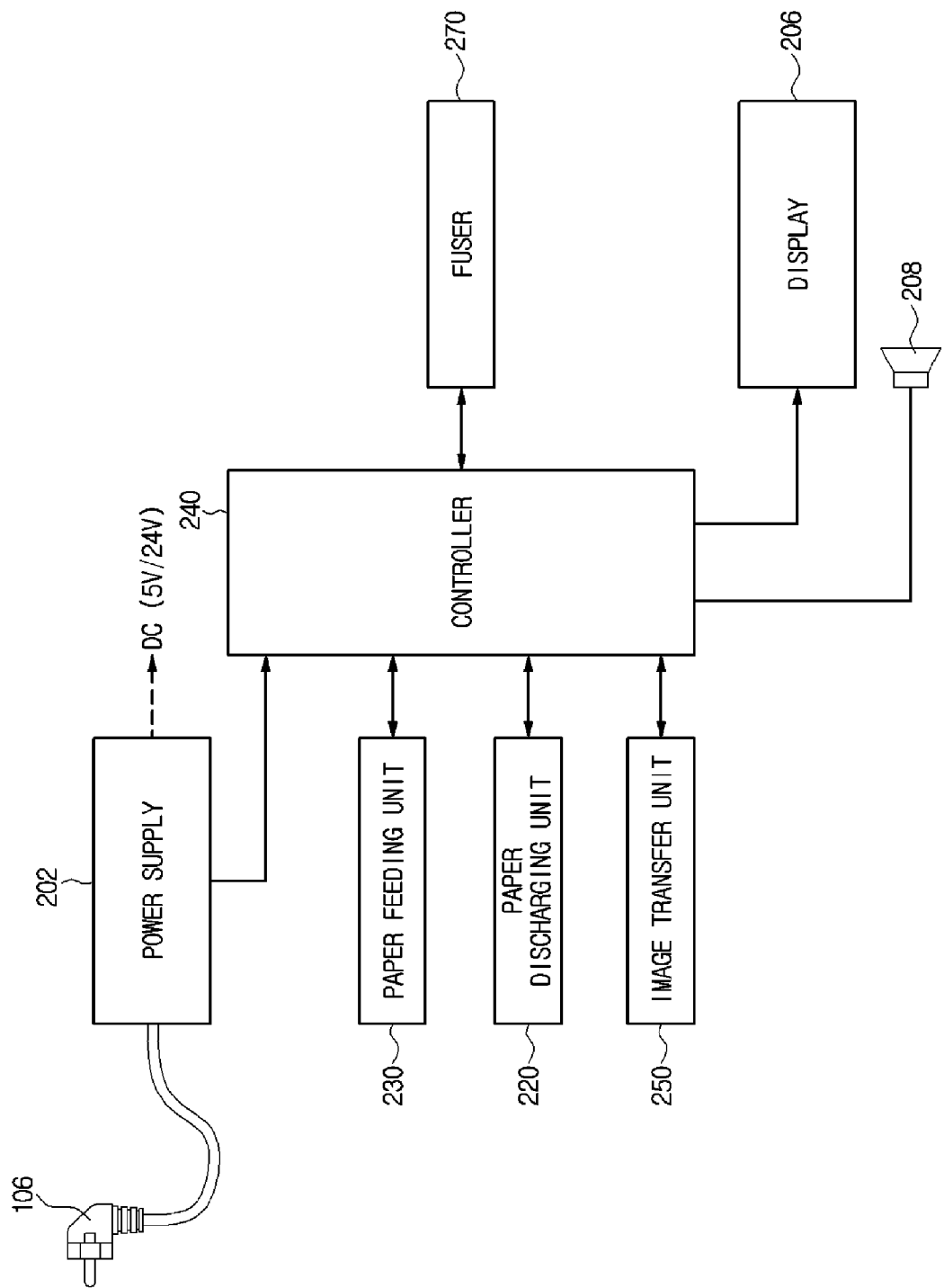
FIG. 2 is a diagram showing a control system of the image forming apparatus illustrated in FIG. 1.

FIG. 2 is a diagram showing a control system of the image forming apparatus illustrated in FIG. 1. As shown in FIG. 2, a controller 240 that controls overall operations of the image forming apparatus 102 is electrically connected to a paper feeding unit 230 and a paper discharging unit 220, an image transfer unit 250, a fuser 270, a display 206, and a speaker 208 in order to communicate. A power supply 202, for example, a switching mode power supply (SMPS), generates 5V and 24V of system DC power through AC-DC conversion, to be supplied to the controller 240, the image transfer unit 250, and other parts. The 5V of DC power is supplied to a microprocessor such as a controller 240, a circuit device, etc., and the 24V of DC power is supplied to the fuser 270, etc. The 5V and 24V of system DC power output from the power supply 202 may be selectively supplied to other components of the image forming apparatus 102. In addition, the power supply 202 may supply normal power to a part that needs the power, for example, a fuser heater of the fuser 270. The paper feeding unit 230 supplies a printing medium (paper) loaded in a paper feeding cassette to the image transfer unit 250. The image transfer unit 250 forms a predetermined image according to image signals, and then transfers the image on an upper surface of the printing medium. The fuser 270 semi-permanently settles the image transferred on the printing medium. The paper discharging unit 220 discharges the printing medium on which the image is settled in the fuser 270. The controller 240 controls overall operations of the image forming apparatus 102, and is electrically connected to a plurality of sensors which detect the status of each part of the image forming apparatus 102 in order to communicate therewith. The display 206 displays an announcement message, etc. to notify a user of driving information or status information of the image forming apparatus 102. The speaker 208 outputs an announcement voice or alarm that occurs during operation of the image forming apparatus 102.

Figure 3:
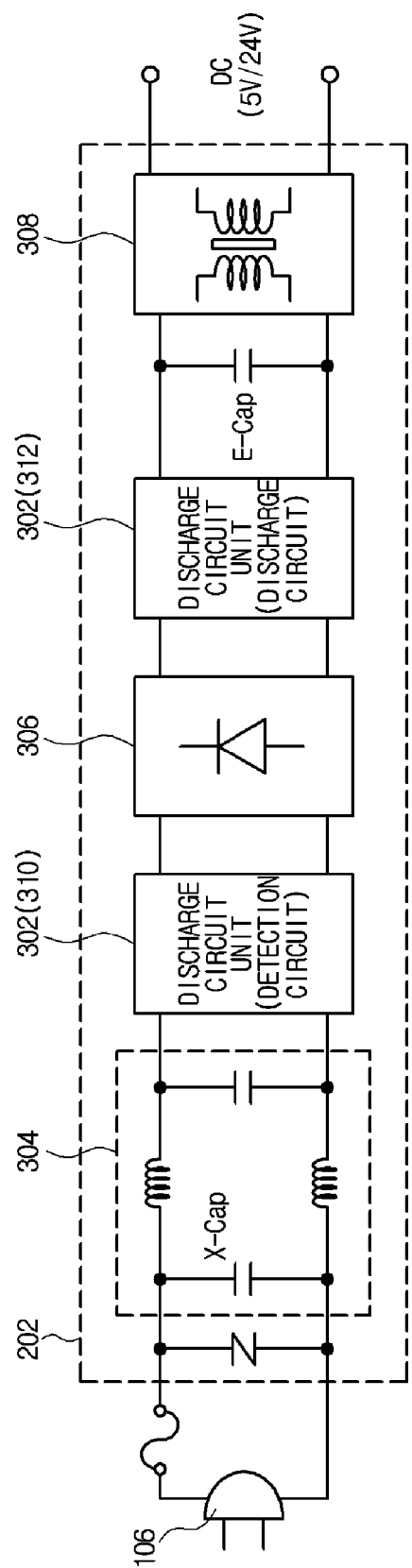
FIG. 3 is a diagram showing an example of a power supply described in FIG. 2 in accordance with an embodiment.

FIG. 3 is a diagram showing an example of the power supply 202 described in FIG. 2 in accordance with an embodiment. The power supply 202 shown in FIG. 3 includes an electromagnetic interference (EMI) filter 304, a detection circuit 310 which is a first switch of a discharge circuit unit 302, a rectifier 306, a discharge circuit 312 which is a second switch of the discharge circuit unit 302, and a transformer 308. The EMI filter 304 is configured to remove various noise included in the power cable 104 to which normal power (AC or DC) is supplied, and is a line filter including a coil and capacitor. The rectifier 306 converts AC power to DC power, or AC power to another AC power having a different phase. The transformer 308 lowers a voltage of the DC power rectified in the rectifier 306 to generate a desired level of DC voltage. The discharge circuit unit 302 includes a detection circuit 310 and a discharge circuit 312, which are electrically connected to a respective front end and back end of the rectifier 306. In addition, the detection circuit 310 and the discharge circuit 312 of the discharge circuit unit 302 are electrically connected to each other, too. An E-capacitor (E-cap) is formed between the discharge circuit 312 of the discharge circuit unit 302 and the transformer 308. The E-cap responds to a temporary interruption of electric power and smoothes DC power flowing into a rectifying diode of the rectifier 306. A large capacitor is used as the E-cap. The E-cap is discharged by the discharge circuit unit 302. The discharge circuit unit 302 controls charges filled in the E-cap to be rapidly discharged via a discharge resistor Rdis.

Figure 4:
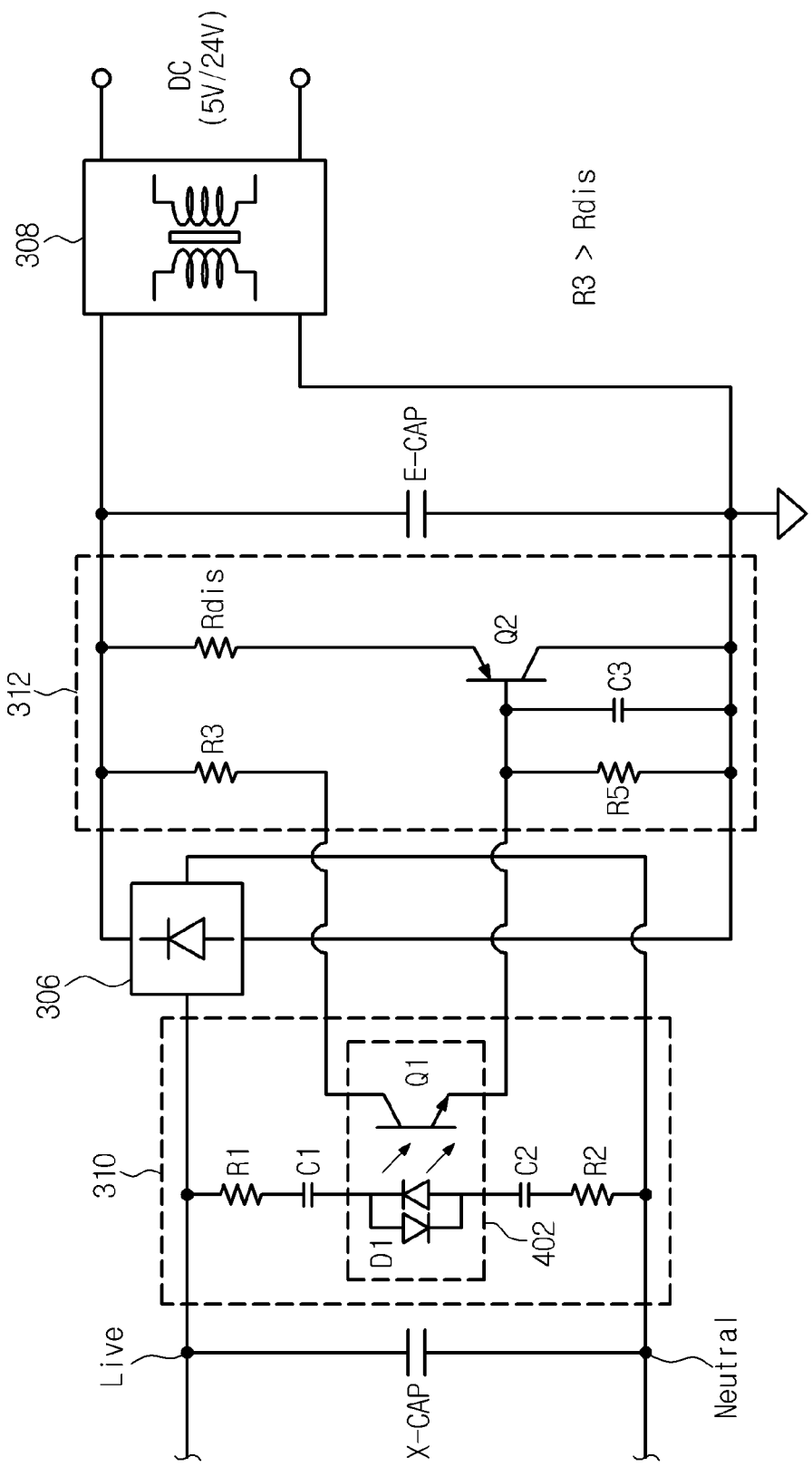
FIG. 4 is a diagram showing a power control device in accordance with an embodiment.

FIG. 4 is a diagram showing a power control device in accordance with an embodiment. As shown in FIG. 4, the detection circuit 310 of the discharge circuit unit 302 formed at the front end of the rectifier 306 is disposed between live and neutral lines, which are AC power supply lines, and the discharge circuit 312 of the discharge circuit unit 302 formed at the back end of the rectifier 306 is disposed between the output lines of the rectifier 306. The detection circuit 310 is formed in such a way that a resistor R1, a capacitor C1, a photo-coupler 402, a capacitor C2, and a resistor R2 are connected in series. Here, the resistor R1, the capacitor C1, the capacitor C2, and the resistor R2 configure an RC series circuit. The photo-coupler 402 is configured of a light emitting diode D1 which is a light emitting device, and a transistor Q1 which is a light receiving device. The light emitting diode D1 is a bidirectional device which responds to each of (+) polarity and (−) polarity of AC power, and (+) polarity and (−) polarity of a discharging current of an X-capacitor (X-cap). When the light emitting diode D1 is turned on to emit light, the transistor Q1 may be turned on by the emission of the light emitting diode Dl. A collector and an emitter of the transistor Q1 are connected to the back end of the rectifier 306 respectively via a resistor R3 and resistor R5 of the discharge circuit 312. That is, the resistor R3, the transistor Q1, and the resistor R5 are connected in series to the back end of the rectifier 306. In addition, a discharge resistor Rdis and transistor Q2 are connected in series to the back end of the rectifier 306. A base of the transistor Q2 is connected between the emitter of the transistor Q1 and the resistor R5. In addition, a capacitor C3 is connected parallel to the resistor R5 between the base of the transistor Q2 and a ground.

Operations of the power control device configured as described above in accordance with an embodiment will be described as follows. While AC power is input via an input line of the AC power, since the two capacitors C1 and C2 in the detection circuit 310 are in an electrically short state, a current may flow via the resistor R1, the capacitor C1, the capacitor C2, and the resistor R2. The light emitting diode D1 is turned on to emit light by the current flow, and the transistor Q1 is turned on by the emission of the light emitting diode D1. When the transistor Q1 is turned on, a current flow through the resistor R3, the transistor Q2, and the resistor R5 may be generated. However, since a base voltage of the transistor Q2 becomes a high level due to a smoothing operation of the resistor R5 and capacitor C3, the transistor Q2 may be maintained in an off state without being turned on. Since the transistor Q2 is maintained in the off state, discharging of the E-cap through the resistor Rdis may not take place. Here, since the resistor R3 has a much greater resistance than the resistor Rdis, the amount of current flowing through the transistor Q1 which is turned on while supplying AC power, that is, the amount of current in a standby mode, is very limited. Accordingly, since the amount of a detection current flowing through the resistor R3 while supplying AC power is very small, power consumption in the standby mode can be reduced as that much.

When the supply of AC power is interrupted due to plug-off of the plug 106, the X-cap which has been blocked by the rectifier 306 starts discharging, and DC power instead of AC power is supplied to the detection circuit 310. Thereby, the capacitors C1, C2, and C3 are switched to an electrically open state, and a DC current flow due to the discharge of the X-cap is blocked. Accordingly, the transistor Q1 is turned off, and a base current of the transistor Q2 flows in a direction into the base of the transistor Q2. As a result, the transistor Q2 is turned on, and thereby a charge current in the X-cap and E-cap may be discharged through the resistor Rdis from when the electrical potential of the X-cap becomes higher than the electrical potential of the E-cap. Here, since the resistor Rdis for discharge has a relatively very small resistance compared to the resistor R3 for current detection, the resistor Rdis can discharge the charge current in the E-cap at a very fast rate.

As described above, the power control device in accordance with an embodiment meets the need for low power consumption since while AC power is input in a plug-on state, a very small amount of current flows through the resistor R3 having a relatively very large resistance. Further, the power control device in accordance with an embodiment also meets the safety requirements since, in a plug-off state, the X-cap or the E-cap is discharged at a very fast rate through the resistor Rdis having a relatively very small resistance.

Figure 5:
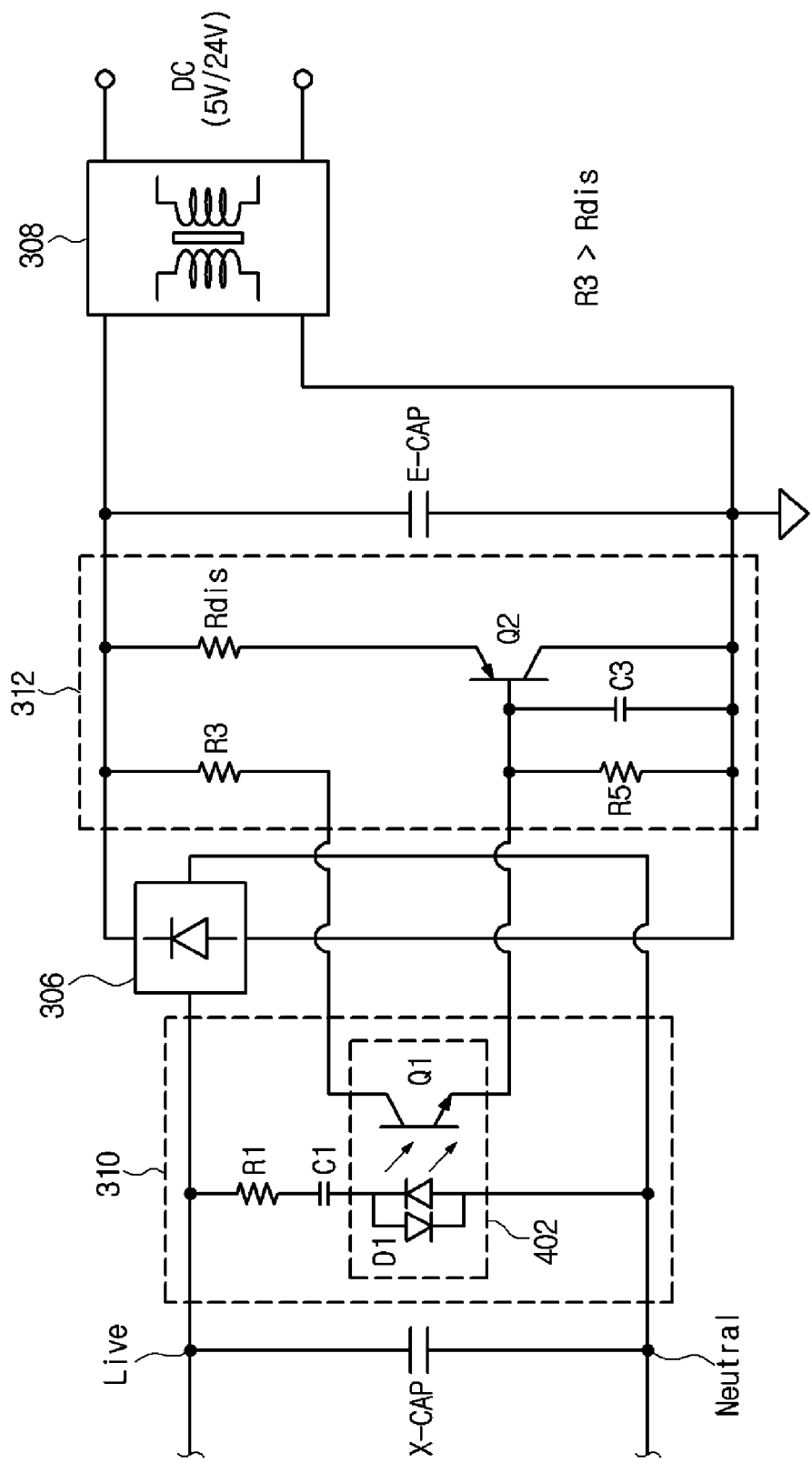
FIG. 5 is a diagram showing a power control device in accordance with an embodiment.

FIG. 5 is a diagram showing a power control device in accordance with an embodiment. As shown in FIG. 5, the power control device in accordance with an embodiment includes an RC series circuit configuring a detection circuit 310 of a discharge circuit unit 302, wherein the RC series circuit is configured of a single resistor R1 and a single capacitor C1. Thereby, a detection circuit is configured of a smaller number of devices than when it consists of two resistors R1 and R2, and two capacitors C1 and C2 in the first embodiment shown in FIG. 4, resulting in saving of components as that much.

As shown in FIG. 5, the detection circuit 310 of the discharge circuit unit 302 formed at a front end of a rectifier 306 is disposed between live and neutral lines, which are AC power supply lines, and a discharge circuit 312 of the discharge circuit unit 302 formed at a back end of the rectifier 306 is disposed between the output lines of the rectifier 306. The detection circuit 310 is formed in such a way that the resistor R1, the capacitor C1, and a photo-coupler 402 are connected in series. Here, the resistor R1 and the capacitor C1 configure an RC series circuit. The photo-coupler 402 is configured of a light emitting diode D1 which is a light emitting device, and a transistor Q1 which is a light receiving device. The light emitting diode D1 is a bidirectional device which responds to each of (+) polarity and (−) polarity of AC power, and (+) polarity and (−) polarity of a discharging current of an X-cap. When the light emitting diode D1 is turned on to emit light, the transistor Q1 may be turned on by the emission of the light emitting diode D1. A collector and an emitter of the transistor Q1 are connected to the back end of the rectifier 306 respectively via a resistor R3 and a resistor R5 of the discharge circuit 312. That is, the resistor R3, the transistor Q1, and the resistor R5 are connected in series to the back end of the rectifier 306. In addition, a resistor Rdis and transistor Q2 for discharge are connected in series to the back end of the rectifier 306. A base of the transistor Q2 is connected between the emitter of the transistor Q1 and the resistor R5. In addition, a capacitor C3 is connected parallel to the resistor R5 between the base of the transistor Q2 and a ground.

Operations of the power control device configured as described above in accordance with an embodiment will be described as follows. While AC power is input via an input line of the AC power, since the capacitor C1 of the detection circuit 310 is in an electrically short state, a current may flow via the resistor R1 and the capacitor C1. The light emitting diode D1 is turned on to emit light by the current flow, and the transistor Q1 is turned on by the emission of the light emitting diode D1. When the transistor Q1 is turned on, a current flow through the resistor R3, the transistor Q2, and the resistor R5 may be generated. However, since a base voltage of the transistor Q2 becomes a high level due to a smoothing operation of the resistor R5 and capacitor C3, the transistor Q2 may be maintained in an off state without being turned on. Since the transistor Q2 is maintained in the off state, discharging of the E-cap through the resistor Rdis may not take place. Here, since the resistor R3 has a much greater resistance than the resistor Rdis, the amount of current flowing through the transistor Q1 which is turned on while supplying AC power, that is, the amount of current in a standby mode, is very limited. Accordingly, since the amount of a detection current flowing through the resistor R3 while supplying AC power is very small, power consumption in the standby mode can be reduced as that much.

When the supply of AC power is interrupted due to plug-off of the plug 106, the X-cap which has been blocked by the rectifier 306 starts discharging, and DC power instead of AC power is supplied to the detection circuit 310. Thereby, the capacitors C1 and C3 are switched to an electrically open state, and a DC current flow due to the discharge of the X-cap is blocked. Accordingly, the transistor Q1 is turned off, and a base current of the transistor Q2 flows in a direction into the base of the transistor Q2. As a result, the transistor Q2 is turned on, and thereby a charge current in the X-cap and E-cap may be discharged through the resistor Rdis from when the electrical potential of the X-cap becomes higher than the electrical potential of the E-cap. Here, since the resistor Rdis for discharge has a relatively very small resistance compared to the resistor R3 for current detection, the resistor Rdis can discharge the charge current in the E-cap at a very fast rate.

As described above, the power control device in accordance with an embodiment meets the need for low power consumption since while AC power is input in a plug-on state, a very small amount of current flows through the resistor R3 having a relatively very large resistance. Further, the power control device in accordance with an embodiment also meets the safety requirements since, in a plug-off state, the X-cap or the E-cap is discharged at a very fast rate through the resistor Rdis having a relatively very small resistance.

Figure 6:
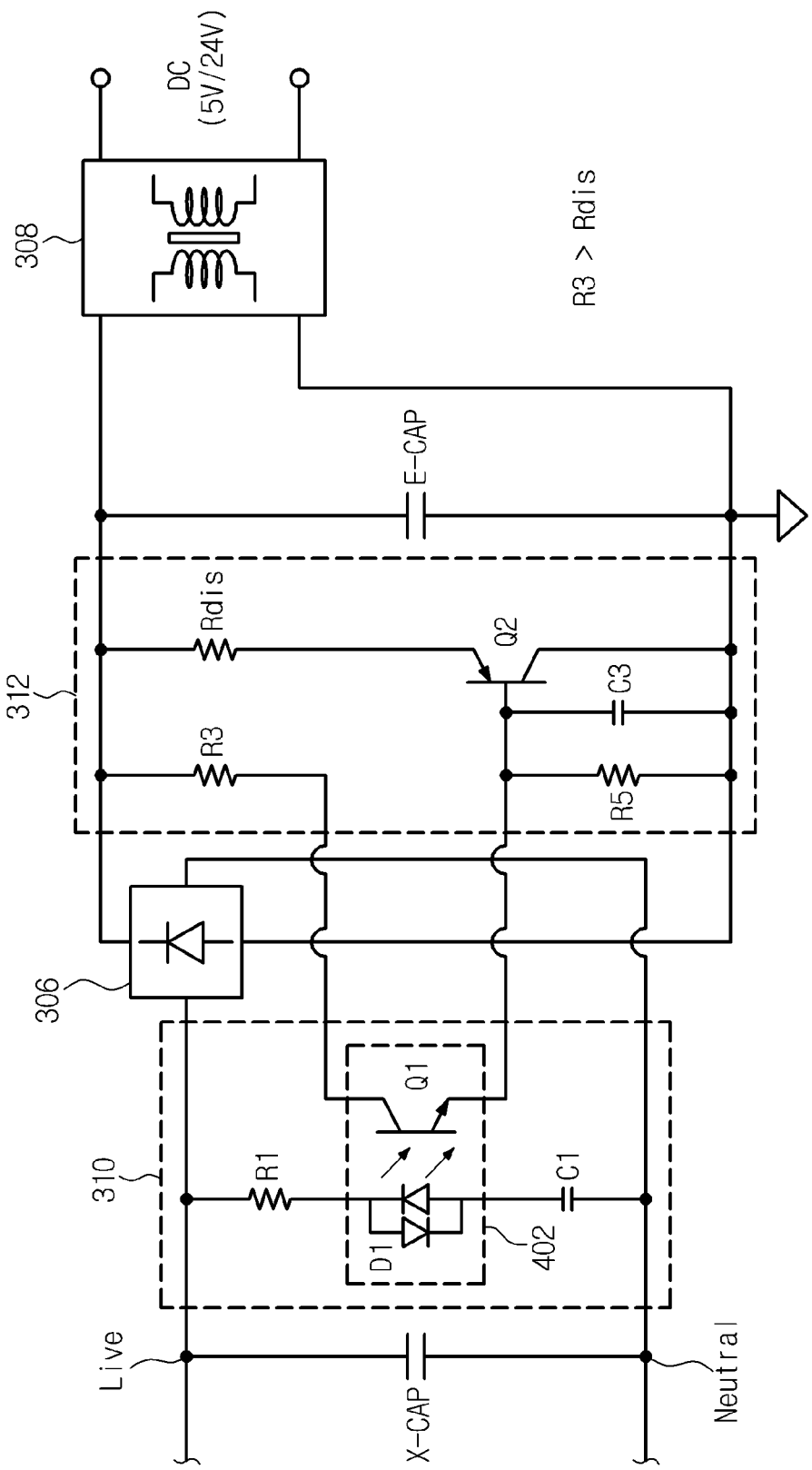
FIG. 6 is a diagram showing a power control device in accordance with an embodiment.

FIG. 6 is a diagram showing a power control device in accordance with an embodiment. As shown in FIG. 6, the power control device in accordance with an embodiment includes an RC series circuit configuring a detection circuit 310 of a discharge circuit unit 302, wherein the RC series circuit is configured of a single resistor R1 and a single capacitor C1. Thereby, a detection circuit is configured of a smaller number of devices than when it consists of two resistors R1 and R2, and two capacitors C1 and C2 in the first embodiment shown in FIG. 4, resulting in saving of components as that much.

As shown in FIG. 6, the detection circuit 310 of the discharge circuit unit 302 formed at a front end of a rectifier 306 is disposed between live and neutral lines, which are AC power supply lines, and a discharge circuit 312 of the discharge circuit unit 302 formed at a back end of the rectifier 306 is disposed between the output lines of the rectifier 306. The detection circuit 310 is formed in such a way that the resistor R1, a photo-coupler 402, and the capacitor C1 are connected in series. Here, the resistor R1 and the capacitor C1 configure an RC series circuit. The photo-coupler 402 is configured of a light emitting diode D1 which is a light emitting device, and a transistor Q1 which is a light receiving device. The light emitting diode D1 is a bidirectional device which responds to each of (+) polarity and (−) polarity of AC power, and (+) polarity and (−) polarity of a discharging current of an X-cap. When the light emitting diode D1 is turned on to emit light, the transistor Q1 may be turned on by the emission of the light emitting diode D1. A collector and an emitter of the transistor Q1 are connected to the back end of the rectifier 306 respectively via a resistor R3 and a resistor R5 of the discharge circuit 312. That is, the resistor R3, the transistor Q1, and the resistor R5 are connected in series to the back end of the rectifier 306. In addition, a resistor Rdis and transistor Q2 for discharge are connected in series to the back end of the rectifier 306. A base of the transistor Q2 is connected between the emitter of the transistor Q1 and the resistor R5. In addition, a capacitor C3 is connected parallel to the resistor R5 between the base of the transistor Q2 and a ground.

Operations of the power control device configured as described above in accordance with an embodiment will be described as follows. While AC power is input via an input line of the AC power, since the capacitor C1 of the detection circuit 310 is in an electrically short state, a current may flow via the resistor R1 and the capacitor C1. The light emitting diode D1 is turned on to emit light by the current flow, and the transistor Q1 is turned on by the emission of the light emitting diode D1. When the transistor Q1 is turned on, a current flow through the resistor R3, the transistor Q2, and the resistor R5 may be generated. However, since a base voltage of the transistor Q2 becomes a high level due to a smoothing operation of the resistor R5 and capacitor C3, the transistor Q2 may be maintained in an off state without being turned on. Since the transistor Q2 is maintained in the off state, discharging of the E-cap through the resistor Rdis may not take place. Here, since the resistor R3 has a much greater resistance than the resistor Rdis, the amount of current flowing through the transistor Q1 which is turned on while supplying AC power, that is, the amount of current in a standby mode, is very limited. Accordingly, since the amount of a detection current flowing through the resistor R3 while supplying AC power is very small, power consumption in the standby mode can be reduced as that much.

When the supply of AC power is interrupted due to plug-off of the plug 106, the X-cap which has been blocked by the rectifier 306 starts discharging, and DC power instead of AC power is supplied to the detection circuit 310. Thereby, the capacitors C1 and C3 are switched to an electrically open state, and a DC current flow due to the discharge of the X-cap is blocked. Accordingly, the transistor Q1 is turned off, and a base current of the transistor Q2 flows in a direction into the base of the transistor Q2. As a result, the transistor Q2 is turned on, and thereby a charge current in the X-cap and E-cap may be discharged through the resistor Rdis from when the electrical potential of the X-cap becomes higher than the electrical potential of the E-cap. Here, since the resistor Rdis for discharge has a relatively very small resistance compared to the resistor R3 for current detection, the resistor Rdis can discharge the charge current in the E-cap at a very fast rate.

As described above, the power control device in accordance with an embodiment meets the need for low power consumption since while AC power is input in a plug-on state, a very small amount of current flows through the resistor R3 having a relatively very large resistance. Further, the power control device in accordance with an embodiment also meets the safety requirements since, in a plug-off state, the X-cap or the E-cap is discharged at a very fast rate through the resistor Rdis having a relatively very small resistance.

Figure 7:
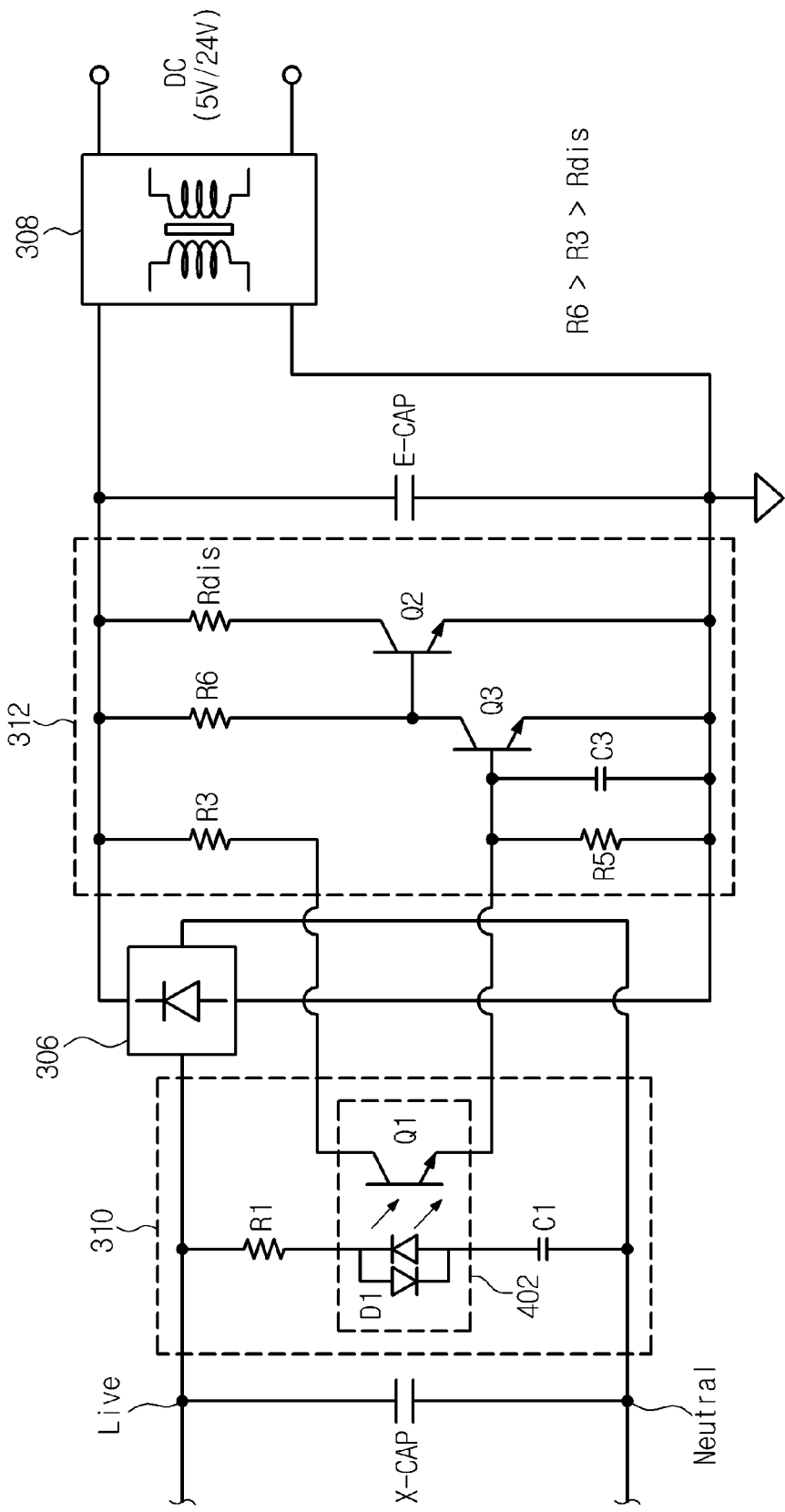
FIG. 7 is a diagram showing a power control device in accordance with an embodiment.

FIG. 7 is a diagram showing a power control device in accordance with an embodiment. As shown in FIG. 7, in the power control device in accordance with an embodiment, a degree of freedom in design of a discharge resistor Rdis and a transistor Q2 can be enhanced by configuring transistors of a discharge circuit 312 to be separated into a multi-stage.

As shown in FIG. 7, a detection circuit 310 of a discharge circuit unit 302 formed at a front end of a rectifier 306 is disposed between live and neutral lines, which are AC power supply lines, and a discharge circuit 312 of the discharge circuit unit 302 formed at a back end of the rectifier 306 is disposed between the output lines of the rectifier 306. The detection circuit 310 is formed in such a way that a resistor R1, a photo-coupler 402, and a capacitor C1 are connected in series. Here, the resistor R1 and the capacitor C1 configure an RC series circuit. The photo-coupler 402 is configured of a light emitting diode D1 which is a light emitting device, and a transistor Q1 which is a light receiving device. The light emitting diode D1 is a bidirectional device which responds to each of (+) polarity and (−) polarity of AC power, and (+) polarity and (−) polarity of a discharging current of an X-cap. When the light emitting diode D1 is turned on to emit light, the transistor Q1 may be turned on by the emission of the light emitting diode D1. A collector and an emitter of the transistor Q1 are connected to the back end of the rectifier 306 respectively via a resistor R3 and a resistor R5 of the discharge circuit 312. That is, the resistor R3, the transistor Q1, and the resistor R5 are connected in series to the back end of the rectifier 306. In addition, a resistor R6 and a transistor Q3 are connected in series to the back end of the rectifier 306. A base of the transistor Q3 is connected between the emitter of the transistor Q1 and the resistor R5. In addition, a capacitor C3 is connected parallel to the resistor R5 between the base of the transistor Q3 and a ground. Further, a resistor Rdis and transistor Q2 for discharge are connected in series to the back end of the rectifier 306. The base of the transistor Q2 is connected between a collector of the transistor Q3 and the resistor R6.

Operations of the power control device configured as described above in accordance with an embodiment will be described as follows. While AC power is input via an input line of the AC power, since the capacitor C1 of the detection circuit 310 is in an electrically short state, a current may flow via the resistor R1 and the capacitor C1. The light emitting diode D1 is turned on to emit light by the current flow, and the transistor Q1 is turned on by the emission of the light emitting diode D1. When the transistor Q1 is turned on, a current flow through the resistor R3, the transistor Q2, and the resistor R5 may be generated. However, since a base voltage of the transistor Q3 becomes a high level due to a smoothing operation of the resistor R5 and capacitor C3, the transistor Q2 may be turned on and maintained in an on state. Although discharging of the E-cap through the resistor R6 occurs since the transistor Q2 is maintained in the on state, the discharging of the E-cap is very slow since the resistor R6 has a very high resistance. A base of the transistor Q2 is connected to the ground by turn-on of the transistor Q3, and thereby the transistor Q2 is not turned on. Therefore, discharging of the E-cap through the resistor Rdis may not occur. Here, since the resistors R3 and R6 have much greater resistances than the resistor Rdis, the amount of current flowing through the transistor Q1 which is turned on while supplying AC power, that is, the amount of current in a standby mode, is very limited. Accordingly, since the amount of a detection current flowing through the resistor R3 while supplying AC power is very small, power consumption in the standby mode can be reduced as that much.

When the supply of AC power is interrupted due to plug-off of the plug 106, the X-cap or E-cap which has been blocked by the rectifier 306 starts discharging, and DC power instead of AC power is supplied to the detection circuit 310. Thereby, the capacitors C1 and C3 are switched to an electrically open state, and a DC current flow due to the discharge of the X-cap is blocked. Accordingly, the transistor Q1 is turned off, the transistor Q3 is also turned off, and thereby a current of the transistor Q2 flows in a direction into the base of the transistor Q2 through the resistor R6. As a result, the transistor Q2 is turned on, and thereby a charge current in the X-cap and E-cap may be discharged through the resistor Rdis from when the electrical potential of the X-cap becomes higher than the electrical potential of the E-cap. Here, since the resistor Rdis for discharge has a relatively very small resistance compared to the resistor R3 for current detection, the resistor Rdis can discharge the charge current in the E-cap at a very fast rate.

As described above, the power control device in accordance with an embodiment meets the need for low power consumption since while AC power is input in a plug-on state, a very small amount of current flows through the resistor R3 having a relatively very large resistance. In addition, the power control device in accordance with an embodiment also meets the safety requirements since, in a plug-off state, the X-cap or the E-cap is discharged at a very fast rate through the resistor Rdis having a relatively very small resistance. Further, a degree of freedom may be increased since sizes of the resistor R5 and capacitor C3 for turn-on and turn-off of the transistor Q3, and sizes of the resistor Rdis and transistor Q2 for discharge can be separately designed by separating the transistor Q2 and the transistor Q3 which are switching devices of the discharge circuit 312 into a multi-stage.

The power control device according to one or more embodiments meets the need for low power consumption by minimizing standby power consumption in a plug-on state of an electronic apparatus. In addition, the power control device in accordance with embodiments meets the safety by increasing a discharging rate of the X-cap or the E-cap in a plug-off state.

Although a few embodiments have been shown and described, it would be appreciated by those skilled in the art that changes may be made in these embodiments without departing from the principles and spirit of the disclosure, the scope of which is defined in the claims and their equivalents.

What is claimed is:
1. A power control device, comprising:
   a first capacitor to be charged by AC power during input of the AC power;
   a rectifier to convert the AC power to DC power;
   a second capacitor formed at an output of the rectifier; and
   a discharge circuit, which includes at least one discharge resistor, and a first switch and a second switch configured to be alternately turned on/off in response to supply and interruption of the AC power, and which discharges at least one of the first and second capacitors via the at least one discharge resistor, in response to turn-off of the first switch and turn-on of the second switch,
   wherein the first capacitor is electrically connected between input lines through which the AC power is input, and
   wherein the first switch is a detection circuit including a photo-coupler configured to be electrically connected between the input lines of the AC power, and turned on in response to input of the AC power and turned off in response to interruption of the AC power.

2. The power control device according to claim 1, wherein the rectifier is connected to the input line of the AC power.

3. The power control device according to claim 1, wherein the second capacitor is disposed at an output of the rectifier.

4. The power control device according to claim 1, wherein the second switch is a discharge circuit including at least one discharge resistor and at least one first transistor which are connected in series to the output of the rectifier.

5. The power control device according to claim 1, wherein the first switch further comprises an RC series circuit which is electrically connected in series to the photo-coupler between the input lines of the AC power.

6. The power control device according to claim 5, wherein the RC series circuit comprises a resistor and a capacitor which are connected in series to an end of the photo-coupler, and another resistor and another capacitor which are connected in series to the other end of the photo-coupler.

7. The power control device according to claim 5, wherein the RC series circuit comprises a resistor and a capacitor which are connected in series to an end of the photo-coupler.

8. The power control device according to claim 5, wherein the RC series circuit comprises a resistor which is connected in series to an end of the photo-coupler, and a capacitor which is connected in series to the other end of the photo-coupler.

9. The power control device according to claim 5, wherein the photo-coupler comprises:
a light emitting device which is connected to the RC series circuit; and
a light receiving device which is configured to be turned on in response to emission of the light emitting device.

10. The power control device according to claim 9, wherein the light emitting device of the first switch is a bidirectional light emitting diode.

11. The power control device according to claim 9, wherein the light receiving device of the first switch is an NPN-type photo transistor, and an emitter and a collector of the photo transistor are electrically connected to the second switch.

12. The power control device according to claim 9, wherein the second switch further comprises a detection resistor which is connected between a collector of the photo-transistor and the output of the rectifier.

13. The power control device according to claim 11, wherein the second switch is a discharge circuit including at least one first transistor, the at least one first transistor of the second switch is a PNP-type bipolar transistor, and an emitter of the first transistor of the at least one first transistor is connected to the discharge resistor, and a collector of the first transistor is connected to a ground.

14. The power control device according to claim 13, wherein the second switch includes an RC parallel circuit which is connected between a base and a collector of the at least one first transistor.

15. The power control device according to claim 12, wherein the second switch has a resistivity of the detection resistor relatively greater than a resistivity of the discharge resistor.

16. The power control device according to claim 13, wherein the second switch further comprises a second transistor which is configured to turn on the first transistor by being turned on in response to turn-off of the photo-coupler.

17. The power control device according to claim 16, wherein the second transistor of the second switch is an NPN-type bipolar transistor, and a collector of the second transistor is connected to the base of a first transistor, and an emitter of the second transistor is grounded.

18. An image forming apparatus having a power control device, comprising:
a first capacitor to be charged by AC power during input of the AC power;
a rectifier which transforms the AC power to DC power;
a second capacitor which is disposed at an output of the rectifier; and
a discharge circuit which includes at least one discharge resistor, and a first switch and a second switch configured to be alternately turned on/off in response to supply and interruption of the AC power, and which discharges at least one of the first and second capacitors via the at least one discharge resistor, in response to turn-off of the first switch and turn-on of the second switch,
wherein the first capacitor is electrically connected between input lines through which the AC power is input, and
wherein the first switch is a detection circuit including a photo-coupler configured to be electrically connected between the input lines of the AC power, and turned on in response to input of the AC power and turned off in response to interruption of the AC power.

19. The image forming apparatus according to claim 18, wherein the rectifier is connected to the input line of the AC power.

20. The image forming apparatus according to claim 18, wherein the second capacitor is disposed at an output of the rectifier.

21. The image forming apparatus according to claim 18, wherein the second switch is a discharge circuit including at least one discharge resistor and at least one first transistor which are connected in series to the output of the rectifier.

* * * * *